(12) United States Patent
Taylor

(10) Patent No.: US 11,885,042 B2
(45) Date of Patent: Jan. 30, 2024

(54) SPINNERET ASSEMBLY FOR SPINNING POLYMERIC FIBERS

(71) Applicant: CYTEC INDUSTRIES INC., Princeton, NJ (US)

(72) Inventor: Thomas Baker Taylor, Greenville, SC (US)

(73) Assignee: CYTEC INDUSTRIES INC., Princeton, NJ (US)

( * ) Notice: Subject to any disclaimer, the term of this patent is extended or adjusted under 35 U.S.C. 154(b) by 129 days.

(21) Appl. No.: 17/696,580

(22) Filed: Mar. 16, 2022

(65) Prior Publication Data

US 2022/0205138 A1 Jun. 30, 2022

Related U.S. Application Data

(62) Division of application No. 15/494,876, filed on Apr. 24, 2017, now Pat. No. 11,306,413.

(60) Provisional application No. 62/326,978, filed on Apr. 25, 2016.

(51) Int. Cl.
| | |
|---|---|
| *D01D 4/02* | (2006.01) |
| *B29C 48/05* | (2019.01) |
| *B29C 48/29* | (2019.01) |
| *B29C 48/27* | (2019.01) |
| *B29C 48/345* | (2019.01) |
| *B29C 48/19* | (2019.01) |
| *B29C 48/92* | (2019.01) |
| *D01D 5/24* | (2006.01) |
| *D01F 9/22* | (2006.01) |

(52) U.S. Cl.
CPC ............... *D01D 4/02* (2013.01); *B29C 48/05* (2019.02); *B29C 48/19* (2019.02); *B29C 48/271* (2019.02); *B29C 48/29* (2019.02); *B29C 48/345* (2019.02); *B29C 48/92* (2019.02); *D01D 5/24* (2013.01); *D01F 9/22* (2013.01); *B29C 2948/92333* (2019.02)

(58) Field of Classification Search
CPC . D01D 4/02; D01D 5/24; B29C 48/05; B29C 48/19; B29C 48/271; B29C 48/29; B29C 48/345; B29C 48/92; B29C 2948/92333; B29C 48/30; D01F 9/22
See application file for complete search history.

(56) References Cited

U.S. PATENT DOCUMENTS 6,284,174 B1 * 9/2001 Ueda ................... D01D 4/00
425/464

* cited by examiner

*Primary Examiner* — Jacob T Minskey
*Assistant Examiner* — Caroline Beha
(74) *Attorney, Agent, or Firm* — Thi Dang

(57) ABSTRACT

A spinneret assembly for spinning polymeric fibers, including: (a) a cap provided with an inlet port and a flared lower surface that flares outwardly from the inlet port in the direction of flow; (b) a spinneret having numerous spinning flow channels through its thickness; (c) a filter freely resting on the spinneret; and (d) a flow guide with a tapered geometry mounted in a cavity defined by the cap and the spinneret. The flow guide has an apex facing the inlet port, a base facing the filter, and one or more side surfaces tapering up to the apex. A diverging flow passage is defined by the tapering side surface(s) of the flow guide and the cap's flared lower surface. The base of the flow guide is spaced apart from an upper surface of the spinneret, creating a space that is in fluid communication with the divergent flow passage.

2 Claims, 8 Drawing Sheets

SPINNERET ASSEMBLY FOR SPINNING POLYMERIC FIBERS

The instant application is a divisional application of U.S. application No. 15/494,876, filed on Apr. 24, 2017, which claims the benefit of prior U.S. Provisional Application No. 62/326,978 filed on Apr. 25, 2016, the entire content of each of these prior filed applications is incorporated herein by reference.

DETAILED DESCRIPTION

Figure 1:
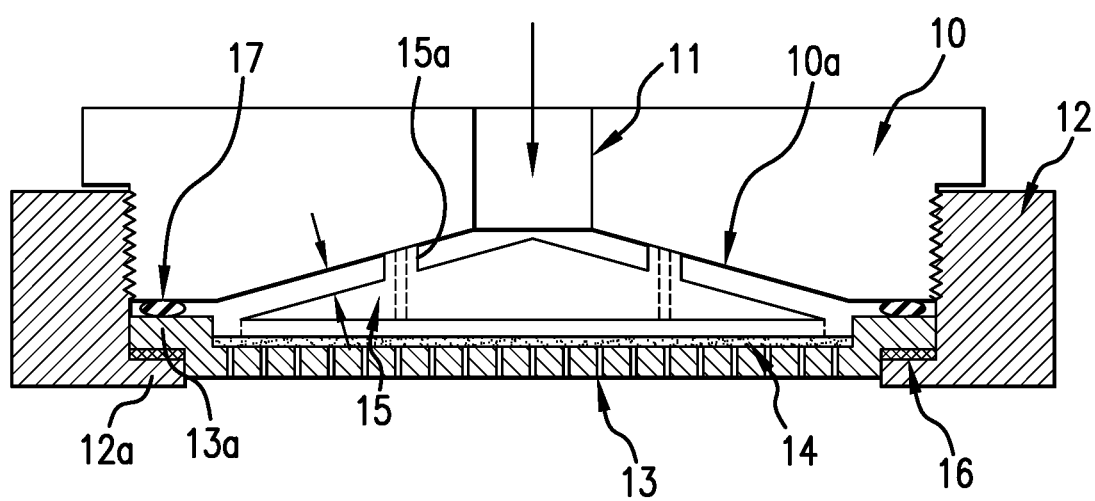
FIG. 1 illustrates a spinneret assembly according to an embodiment of the present disclosure.

In fiber spinning, a liquid polymer solution or molten polymer is extruded through small holes of a spinneret to form thin filaments. Upon leaving the spinneret the filaments solidify. After solidification, the filaments can be drawn or stretched to change the filaments' properties.

Typically, air gap spinning die designs incorporate a breaker plate and distribution filter to distribute the polymer dope across the spinneret wetted area. No consideration is given to distributing the polymer dope in a manner that allows the operator to quickly and easily judge the quality of the dope exiting the die so that ample time is provided to purge the polymer delivery system of air bubbles and polymer gels. Furthermore, the typical die design allows the dope to be introduced to the spinneret cavity so that there is a high risk of air being trapped in the spinneret cavity so that it will take much longer for the air bubbles to break up and which will result in spinning defects hours and even days after startup.

Disclosed herein is a device for spinning polymeric fibers, and more particularly, a spinneret assembly. In some embodiments, the spinneret is capable of both presenting the polymer dope as an annular film suitable for visual inspection for gels or air bubbles prior to spinneret installation and for delivering the dope to the spinneret after installation in such a manner as to avoid having any air in the cavity above the spinneret so that good spinning can be achieved more quickly.

The spinneret assembly disclosed herein may be used in conventional fiber spinning methods, including melt spinning, wet spinning, dry spinning and dry-jet wet spinning.

In dry spinning, a polymer solution, called "dope", is extruded through the spinneret into a heated zone where the solvent evaporates. This is a slower process than the cooling of melt spun fibers and, as a result tends to produce fibers with non-uniform properties and a less circular cross section.

Dry-jet wet spinning is identical to dry spinning except that the polymer dope is extruded through the spinneret into a liquid coagulation bath containing a solvent/non-solvent mixture called the coagulant. The solvent is nearly always the same as that used in the dope and the non-solvent is usually water.

Generally, the spinneret assembly of the present disclosure includes: (a) a cap provided with an inlet port and a flared lower surface that flares outwardly from the inlet port in the direction of flow; (b) a spinneret having numerous spinning flow channels through its thickness; and (c) a flow guide with a tapered geometry mounted in a cavity defined by the cap and the spinneret. The flow guide has an apex facing the inlet port, a base facing the spinneret, and one or more side surfaces tapering up to the apex. A diverging flow passage is defined by the tapering side surface(s) of the flow guide and the cap's flared lower surface. The base of the flow guide is spaced apart from an upper surface of the spinneret, creating a space that is in fluid communication with the divergent flow passage.

FIG. 1 illustrates an embodiment of the spinneret assembly of the present disclosure. The main components of the spinneret assembly include a cap 10 with an inlet port 11, a casing 12, which is removably secured to the cap 10, a spinneret 13 with a plurality of spinning flow channels, a filter 14 resting on the spinneret, and a flow guide 15 with a tapered geometry. The inlet port 11 is extending through the thickness of the cap 10 and, in some embodiments, is centrally located. The flow guide 15 is mounted in the cavity defined by the cap 10 and the spinneret 13. The flow guide 15 is removably attached to the cap 10 via spacers 15a, but is not mechanically affixed or connected to spinneret 13.

Still referring to FIG. 1, the flow guide 15 has a tapered geometry with an apex (or peak) directed toward the exit end of the inlet port 11, a base facing the filter 14, and one or more side surfaces tapered up to the apex. The flow guide's tapered geometry may be a conical or pyramidal shape. The cap 10 has a flared lower surface 10a that flares outwardly from the inlet port 11 in the direction of flow and is spaced apart from the tapered surface(s) of the flow guide 15, creating an annular gap. The annular gap may be substantially constant along most of the tapered surface(s) of flow guide 15. In some embodiments, this gap may be in the range of 0.5 to 10.0 mm. Together, the flared lower surface 10a of cap 10 and the flow guide 15 define a diverging flow passage that is in fluid communication with the inlet port 11. The base of flow guide 15 is spaced apart from the spinneret 13, defining a space in fluid communication with the diverging flow passage. In an embodiment, the base of flow guide 15 is flat or substantially flat and is oriented parallel to the entrance surface of spinneret 13, which is also flat or substantially flat. "Substantially flat" as used herein encompasses surfaces that are not perfectly flat. The space between the flow guide's base and the spinneret's entrance surface may have a gap height of 1 to 20 mm. In alternative embodiments, the flow guide's base may have a curved surface, for example, a convex surface.

Figure 2A:
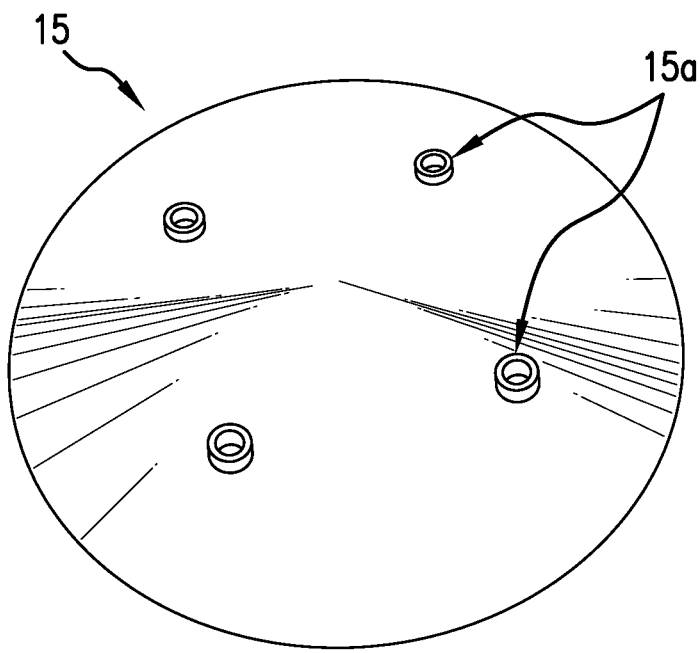
FIGS. 2A and 2B show a perspective view and a cross-sectional view, respectively, of a cone-shaped flow guide according to an embodiment of the present disclosure.
Figure 2B:
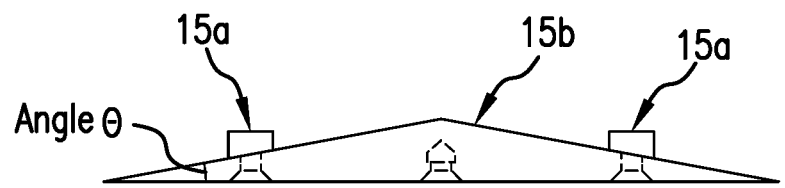
Figure 3:
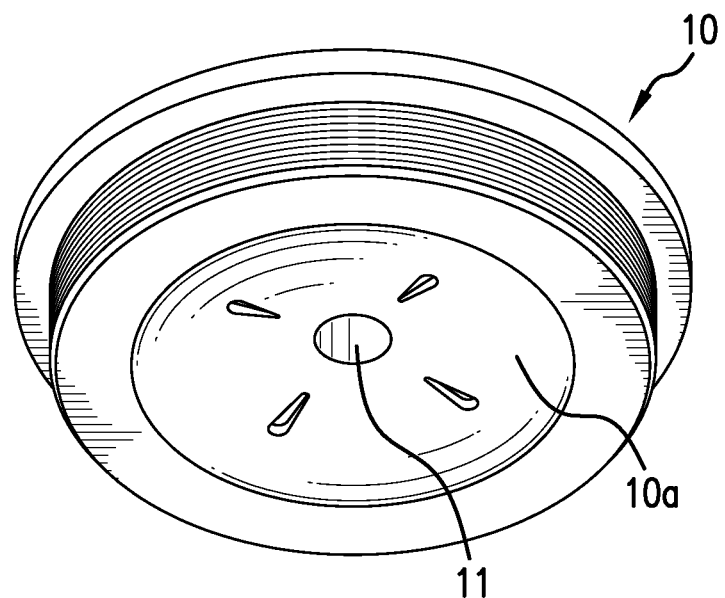
FIG. 3 shows a corresponding cap that can be removably attached to the flow guide shown in FIG. 2A.

In one embodiment, the flared lower surface 10a of cap 10 corresponds to the shape of the flow guide 15. For example, the flow guide 15 may be conical in shape and the flared lower surface 10a may have a truncated conical shape, like a funnel. An exemplary cone-shaped flow guide is illustrated by FIGS. 2A and 2B (perspective and cross-sectional view, respectively), and a corresponding cap is shown in FIG. 3. Referring to FIGS. 2A and 2B, the flow guide 15 has a plurality of spacers 15a on its conical surface 15a to provide the necessary gap between the flared lower surface 10a and flow guide 15. In this embodiment, the spacers are short tubular structures (FIG. 2A), which are axially aligned with screw holes in the flow guide (FIG. 2B). The screw holes extend from the base of the flow guide to the spacers. Although four spacers are shown, the number of spacers is not limited thereto. Blind holes are provided in the cap 10 (FIG. 3) to correspond to the spacers on flow guide 15 and to receive screws extending from the flow guide. To attach the flow guide 15 to the cap 10, the screws are threaded from the base of flow guide 15, through the tubular spacers and into the blind holes in the cap 10.

Referring to FIG. 2B, the conical surface 15b of flow guide 15 forms an acute angle ⊖ (less than 90 degree) relative to the base. The acute angle ⊖ may be 10-90 degrees, and in some embodiments, 15-45 degrees. In an alternative embodiment, the flow guide 15 may have a pyramidal shape with a polygonal bottom surface and three or more triangular inclined surfaces, each forming an acute angle ⊖ with the base, and the flared lower surface 10a of cap 10 may have a truncated pyramidal shape with a plurality of connecting polygonal surfaces that correspond to the inclined surfaces of the flow guide 15.

Although the cap 10 in FIG. 3 is shown as having a circular shape with circular perimeters (or peripheral edges), it should be understood that other shapes and outer geometries are possible. For example, the cap 10 may have square or other polygonal perimeters. And the casing 12 may be varied in shape also as long as it accommodates the shapes and the outer geometry of the cap 10 and the spinneret 13.

Referring again to FIG. 1, the casing 12 is removably secured to the cap 10 such that these two components can be detached from each other with relative ease. One way for providing such removable attachment is to provide the distribution cap 10 and the casing 12 with complementary threaded surfaces where they engage each other. In this way, the casing 12 can be screwed onto or off the cap 10 like a nut-and-bolt fastener. Alternatively, the annular casing 12 can be removably secured to the distribution cap using conventional fasteners such as clamps, an arrangement of countersunk bolts, and other conventional fastening means. The cap 10 and the casing 12 may be made of metal, ceramics, or composites (for example, resin or plastic reinforced with chopped or continuous fibers). The spinneret may be made of metal or ceramics.

Figure 4:
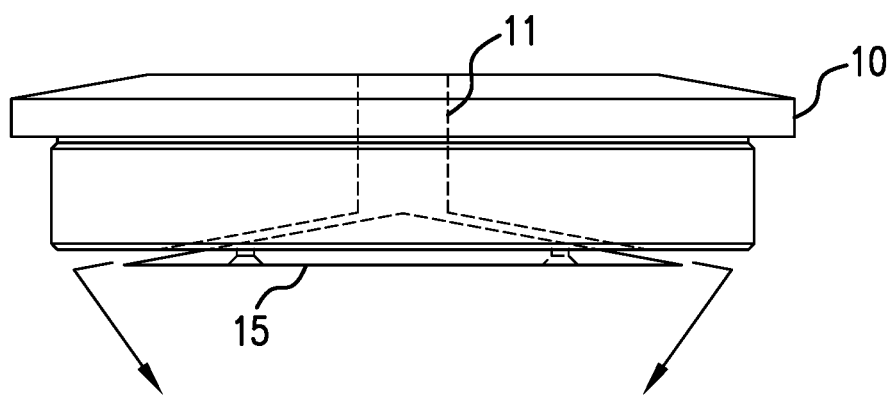
FIG. 4 shows a partial assembly of the cone-shaped flow guide shown in FIG. 2A attached to the corresponding cap shown in FIG. 3.

FIG. 4 shows a partial assembly of the cone shaped flow guide 15 shown in FIG. 2A coupled to the corresponding cap 10 shown in FIG. 3. The partial assembly shown in FIG. 4 (without the removable casing 12 and spinneret 13) is operationally functional "as is" during a preliminary purging step, in which the raw material for spinning fibers (e.g., polymer solution or molten polymer) is introduced continuously under pressure into the inlet port 11, causing the raw material to flow through the diverging flow passage between the cap 10 and the flow guide 15. The discharged material is in the form of a thin tubular film. This preliminary purging step may be carried out for a predetermined time period, e.g. 15 to 90 minutes, to enable the operator to visually inspect the raw material prior to installation of the spinneret 13 and the annular casing 12. A clear polymer solution or molten polymer is desirable for spinning polymeric fiber filaments. Thus, any undesired air bubbles, polymer gels or other impurities in the polymer solution or molten polymer could easily be seen, and if such impurities are seen, the spinneret installation could be delayed until the polymer solution or molten polymer is clear and free of any heterogeneities. This preliminary purging step insures that a spinneret is not installed prematurely, and in that manner, stable spinning can be achieved more quickly than would otherwise be possible.

In the embodiment shown in FIG. 1, the spinneret 13 has a projecting rim 13a, and the casing 12 is configured to couple the projecting rim of the spinneret 13 to a peripheral portion of the cap 10. To that end, the lower end of the annular casing 12 has an inwardly extending flange portion 12a on which the rim 13a rests. The spinneret 13 is supported and held in place by the casing 12 but is not permanently or mechanically attached thereto by any fastening mechanism. The filter 14 is freely resting on the fluid entrance surface of the spinneret 13, covering the spinning flow channels. Optionally, a thin gasket 16 is arranged between the rim 13a and the flange portion 12a to create the correct spinneret height relative to the bottom surface of the casing 12. The gasket 16 corresponds to the shape of the flange portion 12a, for example, it may be ring-shaped when the casing 12 is configured to accommodate a circular-shaped spinneret. In some embodiments, a resilient seal 17, e.g., O-ring, is confined between the rim 13a of spinneret 13 and the peripheral lower portion of cap 10 so as to form a fluid seal between the cap 10 and the spinneret 13, thereby preventing leaking of the polymer solution/melt that will flow through the spinneret assembly.

Figure 5:
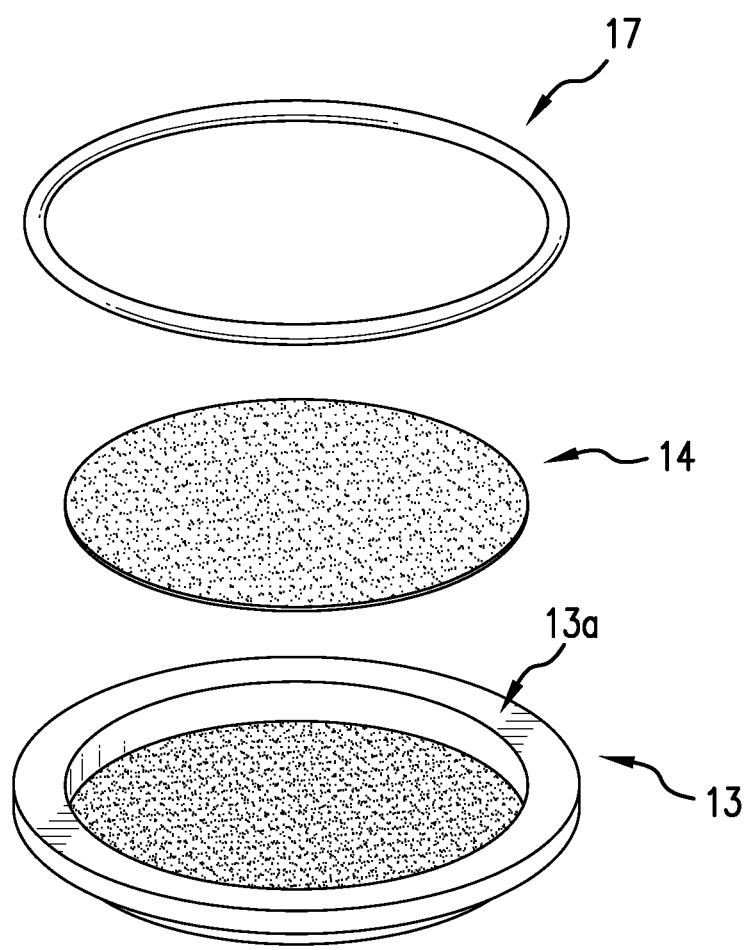
FIG. 5 shows a spinneret, a filter, and an O-ring according to an embodiment of the present disclosure.

FIG. 5 shows, as separate components, the spinneret 13, the filter 14, and the resilient seal 17 according to an embodiment. The spinneret 13 has a central portion surrounded by the projecting rim 13a and this central portion is provided with a large number of spinning flow channels extending through the thickness. The central region has a surface area that is larger than the surface area of the flow guide's base. In this embodiment, the spinneret 13 has a central portion surrounded by the projecting rim 13a and the central portion is provided with a large number of spinning flow channels extending through the thickness. The resilient seal 17 corresponds to the shape of the projecting rim 13a of spinneret 13. In this embodiment, the seal 17 is an O-ring. The filter may have a circular shape to correspond to the shape of the spinneret 13. It should be understood that the spinneret 13, the filter 14 and the seal 17 may have other geometric shapes other than circular as shown in FIG. 5. For example, these components may have square or polygonal perimeters.

The filter 14 is not permanently attached to spinneret 13 and can be easily replaced. Also, the filter 14 is permeable to liquid, particularly polymer solution and low-viscosity molten polymer, and may be in the form of a metal mesh, a nonwoven material, a sintered particle disk or woven fabric composed of cellulosic, polymeric or metallic fibers. The filter may be made of any inert materials that are inert to the polymer solution/melt that will flow through the spinneret assembly. Examples of such inert materials include metal, cellulose, or polymer.

The gasket 16 may be made of aluminum, stainless steel, polytetrafluoroethylene (PTFE), polyethylene, particularly, high-density polyethylene (HDPE), and any other sturdy material that is chemically and thermally impervious to the spinning environment. The resilient seal 17, e.g. O-ring, is made of a flexible material such as EPDM (ethylene propylene diene monomer rubber), silicone, polytetrafluoroethylene (PTFE) or polyethylene (PE), soft aluminum or any other compressible materials that are compatible with the polymer solution/melt being used.

Figure 6:
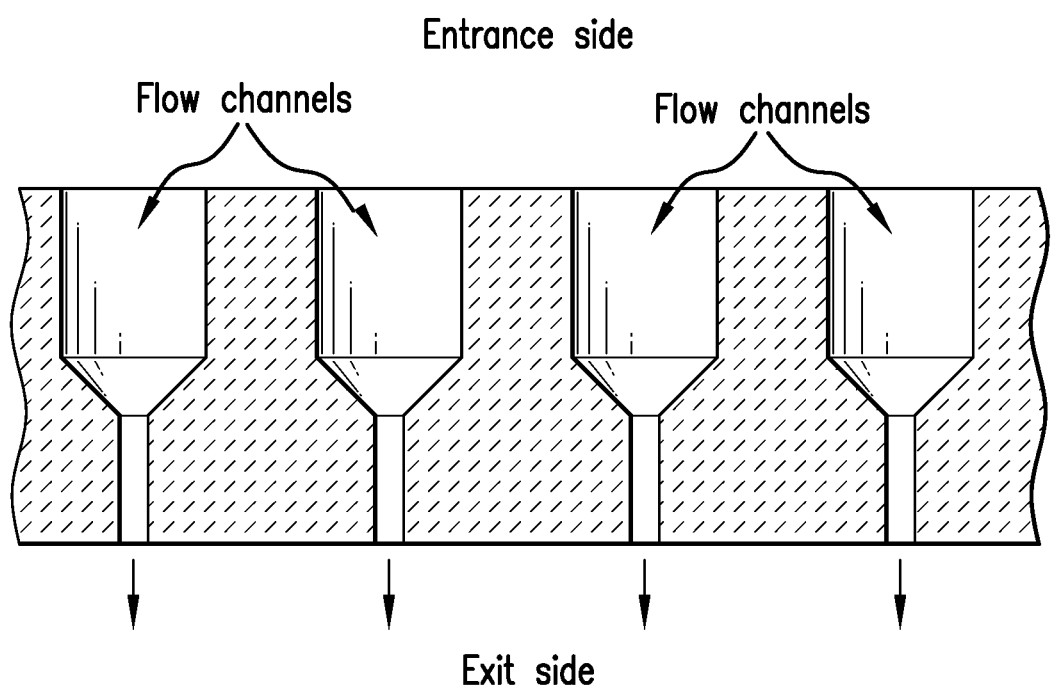
FIG. 6 shows a partial, cross-sectional view of spinning flow channels in a spinneret according to an embodiment of the present disclosure.

FIG. 6 is an exploded cross-section view of the spinning flow channels in the spinneret according to one embodiment. The flow channels of the spinneret may have circular cross-sectional shapes, but other shapes such as oval, square, triangle, pentagon, and other polygonal shapes, are possible. The number of spinning flow channels may vary widely depending on the spinning method, the raw material and the end market for the fiber. For wet spinning using a polymer solution, the number of spinning flow channels may be at least 1000, for example, in the range of 3000 to 75000. For dry-jet wet spinning, the range may be from 100 to 10000. For melt spinning using a molten polymer, the number of spinning flow channels may be in the range of 25 to 100,000. For flow channels with circular cross-sections, the diameter of the openings at the entrance side ("entrance openings") of the spinneret is larger than the diameter of those at the exit side ("exit openings") as shown in FIG. 6. In one embodiment, the diameter of entrance openings may be 10 to 100 times that of exit openings. For example, the entrance openings may have a diameter in the range of 1000-15000 μm and the exit openings may have a diameter in the range of 40-500 μm. The length of the spinning flow channels (i.e., the thickness of the spinneret's central portion where the flow channels are located) may be in the range of 2 to 50 mm. The density of the entrance openings in the upper surface region of the spinneret 13 may be in the range of 5 to 200 openings/cm². Similarly for non-circular openings, the size (as determined by perimeter) of the entrance openings may be larger than the size of the exit openings, for example, 10 to 100 times larger.

Figure 7:
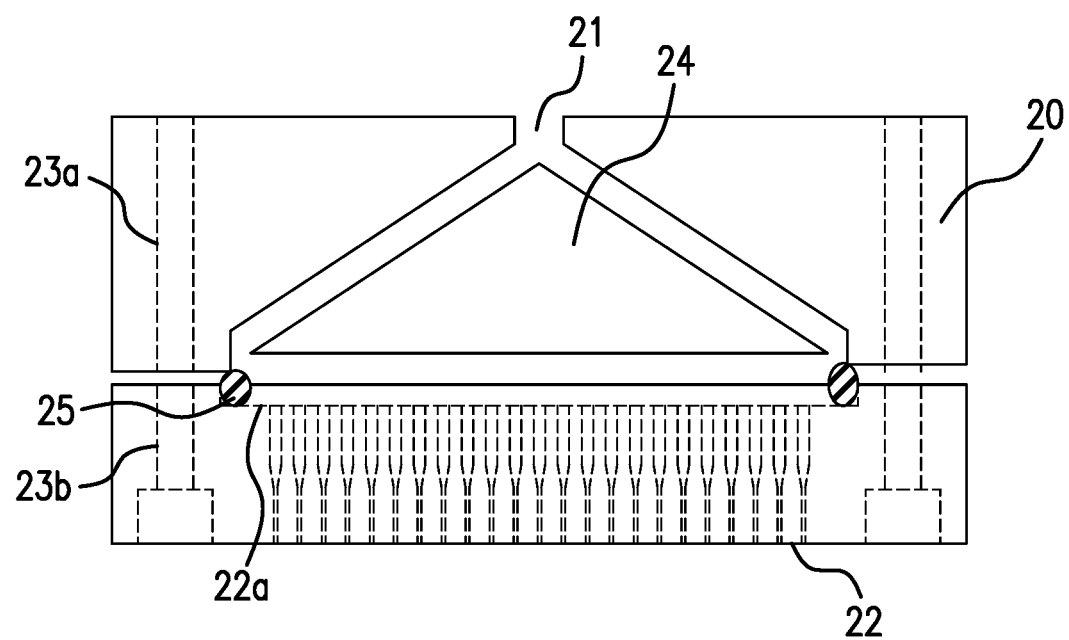
FIG. 7 shows a spinneret assembly according to another embodiment of the present disclosure.

FIG. 7 shows an alternative embodiment for the spinneret assembly. In this embodiment, a cap 20 with inlet port 21 is coupled to a spinneret 22 directly (without the casing 12 shown in FIG. 1) and the spinneret 22 does not have a projecting rim. Complementary threaded holes (23a in cap 20 and 23b in spinneret 22) are provided through the cap and the spinneret to accommodate threaded bolts (not shown) for coupling the cap to the spinneret. A tapered flow guide 24 is mounted in the cavity defined by the cap 20 and the spinneret 22. A resilient seal 25, e.g., O-ring, is wedged between the cap 20 and the spinneret 22 to provide a fluid seal. The cap 20 and the flow guide 24 are configured to define a diverging flow passage that is in fluid communication with the inlet port 21 as described above in reference to FIG. 1. Also, the flow guide 24 is removably attached to the cap 20 via spacers (not shown for simplicity) as described above with reference to FIGS. 1, 2A and 2B. The spinneret 22 has a recessed surface on which a filter (not shown for simplicity) can be placed. The filter is as described above with reference to FIG. 5. The spinneret's recessed surface 22a faces the base of the flow guide 24 and contains numerous openings, which correspond to the spinning flow channels of the spinneret. The spinning flow channels in the spinneret are as described above. When the spinneret 22 is disengaged from the cap 20, the partial assembly of the cap 20 and flow guide 24 can function in a preliminary purging step as described with reference to FIG. 4.

Figure 8:
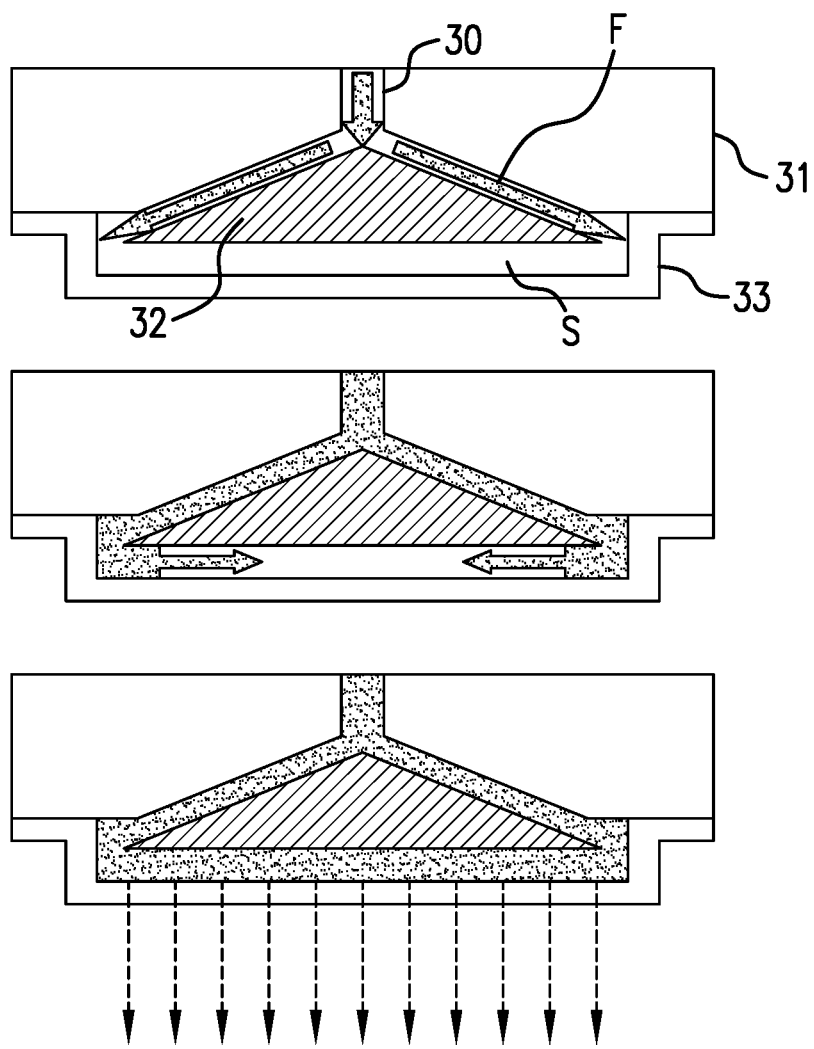
FIG. 8 illustrates the flow passage of raw material through the spinneret assembly of the present disclosure.

The flow passage of the raw material (hereafter "polymer dope") through the spinneret assembly of the present disclosure is illustrated by FIG. 8. In operation, the polymer dope is introduced continuously under pressure into the inlet port 30 of cap 31. During operation, the inlet port 30 is connected to a polymer supply, typically coming from a metering pump (not shown). From inlet port 30, the polymer dope flows through the divergent flow path F surrounding the tapered surface (e.g. conical face) of the flow guide 32, then flows around the perimeter of the flow guide's base into the space S between the flow guide's base and the spinneret 33, filling this space S. The polymer dope fills the space S radially inwardly from the perimeter of the flow guide's base toward the center of this space. Any air that is trapped in the flow passage F and the space S is pushed out first through the unobstructed spinning flow channels in the spinneret 33. When the space S is completely filled with the polymer dope and the pressure therein reaches a certain level, the dope passes through the filter (not shown) and is extruded through the many spinning flow channels in spinneret 33, forming continuous polymer filaments at the exit side of the spinneret 33. Note that space S is not obstructed by any intervening structures that could prevent the polymer dope from passing through all of the flow channels in the spinneret.

Figure 9:
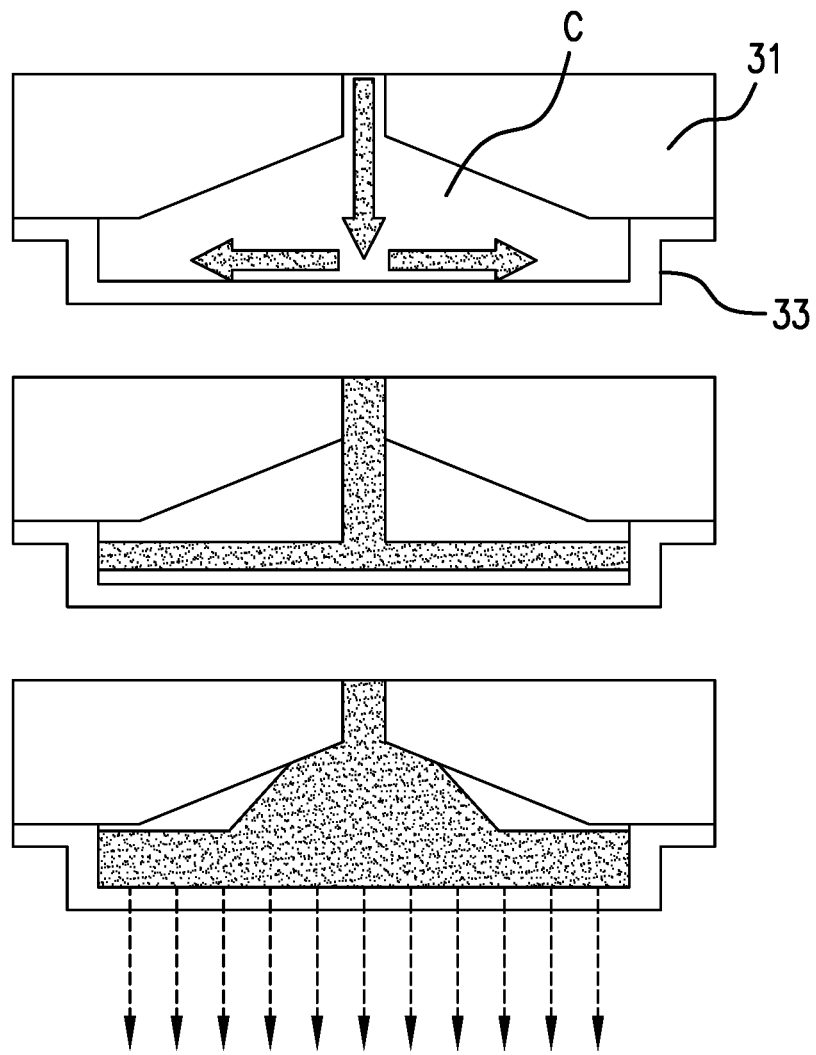
FIG. 9 illustrates the flow passage of raw material through the same spinneret assembly without a flow guide, as a comparison.

FIG. 9 shows how the polymer dope would flow through the same spinneret assembly shown in FIG. 8 without the flow guide 32, as a comparison. In this situation, the polymer dope fills the cavity C (defined by the cap 31 and the spinneret 33) from center out, causing air pockets to be trapped in the cavity without a way to escape except by becoming entrained in the polymer material exiting the spinning flow channels. As a consequence, air entrainment in the material causes breakage in the discharged filaments or polymer drips instead of continuous filaments.

The spinneret assembly described herein may be used in a wet spinning or dry-jet wet spinning (also known as "air-gap spinning") process to produce polyacrylonitrile (PAN) precursor fibers, which can be converted subsequently into carbon fibers. To make PAN precursor fibers, a PAN polymer solution (called spin "dope") is formed as an initial step. This spin dope may contain a polymer concentration within the range of 5%-28% by weight (preferably, 15% to 25%), based on the total weight of the solution. In the case of wet spinning, the dope extruded through the spinneret enter enters directly into a liquid coagulation bath to form filaments. The spinneret holes determine the desired filament count of the PAN fiber (e.g., 3,000 holes for 3K carbon fiber). In air-gap spinning, a vertical air gap of 1 to 50 mm, preferably 2 to 15 mm, is maintained between the spinneret and the coagulating bath. In air-gap spinning, the dope extruded from the spinneret enters an air gap prior to being coagulated in the coagulating bath. The coagulation liquid used in these spinning processes is a mixture of solvent and non-solvent. Water or alcohol is typically used as the non-solvent. The ratio of solvent and non-solvent and bath temperature is used to adjust the solidification rate of the extruded filaments in coagulation.

In some embodiments, the spun filaments are then withdrawn from the coagulation bath by rollers through a wash bath to remove excess coagulant and stretched in hot water baths to impart molecular orientation to the filaments, as the first step of controlling the fiber diameter. The stretched filaments are then dried, for example, on drying rolls. The drying rolls may be composed of a plurality of rotatable rolls arranged in series and in serpentine configuration, over which the filaments pass sequentially from roll to roll and under sufficient tension to provide filaments stretch or relaxation on the rolls. At least some of the rolls are heated by means of pressurized steam which is circulated internally or through the rolls, or electrical heating elementals inside of the rolls. To convert the PAN precursor fibers into carbon fibers, the PAN precursor fibers are subjected to oxidation and carbonization.

The spinneret assembly disclosed herein may be used in a melt spinning method if the polymer can be melted to an appropriate low viscosity without degradation. This method is suitable for spinning thermoplastic fibers from polymers such as polypropylene, nylon, and polyester fibers. In melt spinning, a pressurized molten polymer is introduced into the inlet port and extruded through the spinneret into a gaseous medium, such as air, where the extruded fibers cools, producing solid continuous filaments. The filaments are then drawn to orient the polymer molecules and to improve the tensile properties of the resulting fibers.

While various embodiments are described herein, it will be appreciated from the specification that various combinations of elements, variations of embodiments disclosed herein may be made by those skilled in the art, and are within the scope of the present disclosure. In addition, many modifications may be made to adapt a particular situation or material to the teachings of the embodiments disclosed herein without departing from essential scope thereof. Therefore, it is intended that the claimed invention not be limited to the particular embodiments disclosed herein, but that the claimed invention will include all embodiments falling within the scope of the appended claims.

The invention claimed is:

1. A method for fiber spinning comprising:
 providing a spinneret assembly comprising:
   (a) a cap provided with an inlet port and a flared lower surface that flares outwardly from the inlet port in the direction of flow;
   (b) a spinneret having an upper surface, a lower surface, and a central portion, said central portion having numerous spinning flow channels through its thickness; and
   (c) a flow guide with a tapered geometry mounted in a cavity defined by the cap and the spinneret, said flow guide having an apex facing the inlet port, a base, and one or more side surfaces tapering up to the apex, said side surface(s) forming an acute angle with the base,
   wherein a diverging flow passage is defined by the tapering side surface(s) of the flow guide and the cap's flared lower surface, the base of the flow guide is spaced apart from the upper surface of the spinneret, creating a space that is in fluid communication with the divergent flow passage, and the space between the flow guide's base and the spinneret's upper surface is void of any intervening structure;
 continuously feeding a raw material in the form of a polymer solution or molten polymer into the inlet port of the spinneret assembly and ejecting the raw material through the numerous spinning flow channels in the spinneret, forming a plurality of continuous filaments,
 wherein the raw material from the inlet port flows through the diverging flow passage and then radially inward into the space between the flow guide's base and the upper surface of the spinneret, filling said space.

2. The method of claim 1, further comprising a preliminary purging stage prior to feeding the raw material into the inlet port of the spinneret assembly, the preliminary purging stage comprising:
 providing a partial assembly which comprises the flow guide affixed to the cap but does not comprise the spinneret;
 continuously feeding a raw material in the form of a polymer solution or molten polymer through the partial assembly for a time period, causing the raw material to flow through the diverging flow passage; and
 inspecting the raw material discharging from the diverging flow passage,
 wherein said preliminary purging stage occurs prior to assembling the complete spinneret assembly which includes the spinneret.

* * * * *